US009086104B2

(12) United States Patent
McCann et al.

(10) Patent No.: US 9,086,104 B2
(45) Date of Patent: Jul. 21, 2015

(54) SYSTEM AND METHOD FOR CONTROLLING WHEEL SPIN AND WHEEL SLIP ON A MACHINE HAVING DIFFERENTIALLY DRIVEN WHEELS

(75) Inventors: Gerry O. McCann, Dunlap, IL (US); Yun Liu, Peoria, IL (US); Keith F. Harvey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1010 days.

(21) Appl. No.: 12/617,748

(22) Filed: Nov. 13, 2009

(65) Prior Publication Data

US 2010/0161190 A1 Jun. 24, 2010

Related U.S. Application Data

(60) Provisional application No. 61/139,677, filed on Dec. 22, 2008.

(51) Int. Cl.
*G01C 21/00* (2006.01)
*F16D 48/06* (2006.01)
(Continued)

(52) U.S. Cl.
CPC ............... *F16D 48/06* (2013.01); *B60K 17/20* (2013.01); *B60K 23/04* (2013.01); *B60W 10/119* (2013.01); *B60W 10/14* (2013.01); *B60W 10/16* (2013.01); *B60W 30/045* (2013.01); *B60W 30/18145* (2013.01); *B60W 2520/14* (2013.01); *B60W 2520/22* (2013.01); *B60W 2520/28* (2013.01); *B60W 2720/10* (2013.01);
(Continued)

(58) Field of Classification Search
CPC ...... B62D 12/00; B62D 11/003; B62D 9/002; B62D 13/025; B62D 53/005; B62D 53/06; B62D 61/10; B62D 6/003; B62D 7/04; B62D 11/183; B62D 7/1509; B60W 30/045; B60W 2520/28; B60W 10/20; B60W 2720/403; B60W 10/184; B60W 10/146; B60W 30/18145; B60W 10/119; B60W 23/04; B60W 10/14; B60W 17/20; B60W 2520/14; B60W 2520/22; B60W 2520/26; B60W 2720/406; B60W 2720/28; B60W 2720/10; F16D 48/06; F16D 2500/10431; F16D 2500/3108; Y10T 477/606; B60Y 2200/147; B60Y 2200/14; B60Y 2200/20; B60Y 2200/222; B60Y 2200/148
USPC .............. 701/69–75, 82–85, 87–90; 180/245, 180/246, 248
See application file for complete search history.

(56) References Cited

U.S. PATENT DOCUMENTS

| 4,936,405 A | 6/1990 | Hrovat |
| 5,631,829 A | 5/1997 | Takasaki et al. |

(Continued)

*Primary Examiner* — John Q Nguyen
*Assistant Examiner* — Jordan S Fei
(74) *Attorney, Agent, or Firm* — Richard Chang; Miller, Matthias & Hull LLP (57) ABSTRACT

An electronic traction optimization system includes a control unit adapted to produce a corner speed estimate signal for each wheel of a machine, produce an ideal target speed signal for each wheel having a value at least partially responsive to the corner speed estimate signals, produces a practical target speed signal for each wheel, generates an actual target speed signal having a value responsive to a comparison of the ideal target speed signal and the practical target speed signal for each wheel. The control unit compares each actual target speed signal to an associated wheel speed signal to obtain a wheel speed error signal for each wheel and converts each wheel speed error signal to a clutch control signal, wherein each differential clutch actuator is responsive to an associated clutch control signal.

26 Claims, 9 Drawing Sheets

(51) Int. Cl.
  *B60K 17/16* (2006.01)
  *B60K 23/04* (2006.01)
  *B60W 10/119* (2012.01)
  *B60W 10/14* (2012.01)
  *B60W 10/16* (2012.01)
  *B60W 30/045* (2012.01)
  *B60W 30/18* (2012.01)

(52) U.S. Cl.
  CPC ..... *B60W 2720/28* (2013.01); *B60W 2720/403* (2013.01); *B60W 2720/406* (2013.01); *B60Y 2200/14* (2013.01); *B60Y 2200/147* (2013.01); *B60Y 2200/148* (2013.01); *B60Y 2200/20* (2013.01); *B60Y 2200/222* (2013.01); *F16D 2500/10431* (2013.01); *F16D 2500/3108* (2013.01); *Y10T 477/606* (2015.01)

(56) References Cited

U.S. PATENT DOCUMENTS

| | | | |
|---|---|---|---|
| 5,879,061 A * | 3/1999 | Koibuchi | 303/146 |
| 5,989,147 A | 11/1999 | Forrest et al. | |
| 6,487,486 B1 | 11/2002 | Anderson | |
| 6,553,303 B2 | 4/2003 | Matsuno | |
| 6,865,470 B2 | 3/2005 | Ohtsu | |
| 6,878,085 B2 | 4/2005 | Matsuno | |
| 7,077,779 B2 | 7/2006 | Yoshioka et al. | |
| 7,195,579 B2 | 3/2007 | Claussen et al. | |
| 2006/0173584 A1* | 8/2006 | Einig et al. | 701/1 |
| 2007/0294017 A1 | 12/2007 | Joshi et al. | |
| 2007/0295545 A1* | 12/2007 | Romig et al. | 180/197 |
| 2009/0057047 A1* | 3/2009 | Beechie et al. | 180/233 |
| 2010/0256887 A1* | 10/2010 | Linda et al. | 701/82 |

* cited by examiner

SYSTEM AND METHOD FOR CONTROLLING WHEEL SPIN AND WHEEL SLIP ON A MACHINE HAVING DIFFERENTIALLY DRIVEN WHEELS

CROSS-REFERENCED TO RELATED APPLICATIONS

This application claims benefit of U.S. Provisional Application No. 61/139,677 filed Dec. 22, 2008.

TECHNICAL FIELD

This disclosure generally relates to wheel-slip control systems for machines having differentially driven wheels. More particularly, this disclosure relates to systems and methods for controlling wheel-slip for articulated machines in which slip may be controlled by application of a differential clutch force.

BACKGROUND

Machines used in on-road and off-road locations may experience loss of traction. Such machines include motor graders, wheel harvesters, rotary mixers, wheel skidders, four-wheel drive vehicles, quarry construction trucks, large mining trucks, wheel loaders, wheel tractor scrapers, and articulated trucks. Certain machines, such as articulated trucks, have a front cab and a rear dump body hinged together by a joint for relative movement about a vertical axis. Each of the front cab and rear dump body includes at least one wheel set having at least one left wheel and at least one right wheel. Each axle may be rigid as articulated trucks generally steer by the angle between the front cab and rear dump body. The angle between the cab and the dump body may be determined by hydraulic rams in response to steering wheel input. Each wheel set may further include a differential which allows the respective wheels of a wheel set to rotate at different angular velocities, thereby allowing the machine to turn.

Differentials often include a differential clutch for limiting or overriding the differential to reduce wheel spin (i.e., traction control during acceleration) or wheel slip (i.e., anti-lock braking during deceleration). During acceleration, for example, if one of the wheels of a wheel set loses traction, an open differential will normally reduce torque delivered to the non-spinning wheel, thereby limiting the overall driving torque delivered to the wheels. The differential clutch, however, can override the differential to increase the amount of torque transmitted to the non-spinning wheel. For example, the differential clutch may include interposed plates and a piston configured to compress the plates together, thereby transferring torque from a machine drive shaft to the axles coupled to the wheels. The differential clutch may be used in a similar manner to minimize wheel slip during deceleration.

Some differential clutches permit partial clutch engagement to allow greater control over the amount of torque delivered to the wheels. In the foregoing example, the differential clutch piston may be pressure modulated so that the amount of torque transferred to the wheels may be a function of the amount of piston pressure applied to the plates. Thus, engagement of the differential clutch can be controlled to reduce wheel spin and slip, thereby improving torque control in low traction environments, albeit at the cost of a reduction in turning capability.

Existing traction control systems generally compare wheel speeds across an axle and apply a brake or clutch if the wheel speed difference is beyond a predetermined threshold. However, such control systems do not fully account for natural wheel speed differences that occur while steering or turning. In particular, some systems observe wheel spin or slip ratios and activate corrective controls when a predetermined threshold has been exceeded. Other systems observe wheel acceleration and activate corrective controls when a specific acceleration has been reached. There are also systems which observe both wheel spin or slip ratios and acceleration, and activate corrective controls when either predetermined threshold has been exceeded. These conventional systems may use state machine based control strategies. Such a system monitors wheel spin, slip or acceleration against predetermined thresholds in one state, and transitions to another state when the thresholds have been exceeded and so forth. By relying solely on wheel speed and transitioning between discrete states, the dynamics of wheel control change appreciably for different operating speeds.

Therefore, there is a need for a control system which optimizes traction and accounts for natural wheel speed differences that occur while steering or turning.

SUMMARY OF THE DISCLOSURE

According to one aspect of the disclosure, a method is provided of optimizing traction for a machine having a transmission operably coupled to a front axle and a rear axle, the front axle including a cross-axle differential and a differential clutch, the rear axle including a cross-axle differential and a differential clutch, each differential clutch including an actuator, and two wheels coupled to each of the front and rear axles. The method may include sensing a wheel speed of each wheel and responsively producing associated wheel speed signals and sensing an orientation of the machine and responsively producing a yaw rate signal. The method may further include producing a corner speed estimate signal for each wheel having a value responsive to the wheel speed signals and yaw rate signal, producing an ideal target speed signal having a value responsive to the corner speed estimate signal associated with each wheel, producing at least one practical target speed signal for each wheel having a value responsive to the wheel speed signals, deriving an actual target speed signal from the ideal target speed signal and the at least one practical target speed signal for each wheel, comparing each actual target speed signal to an associated wheel speed signal to obtain a wheel speed error signal for each wheel, and converting each wheel speed error signal to a clutch control signal, wherein each differential clutch actuator is responsive to an associated clutch control signal.

According to other aspects of the disclosure, an electronic traction optimization system is provided for a machine having a transmission operably coupled to a front axle and a rear axle, two wheels coupled to each of the front and rear axles, and a cross-axle differential disposed between each of the front and rear axles. The system may include a wheel speed sensor associated with each wheel and adapted to generate a wheel speed signal, an orientation sensor responsive to an orientation of the machine from which a yaw rate signal is derived, and a differential clutch associated with each differential, each differential clutch including a torque transfer mechanism configured to override the associated differential and an actuator configured to operate the torque transfer mechanism. The system may further include a control unit adapted to produce a corner speed estimate signal for each wheel having a value responsive to the wheel speed signals and yaw rate signal, produce an ideal target speed signal having a value responsive to the corner speed estimate signal associated with each wheel, produce at least one practical target speed signal for each wheel having a value responsive to the wheel speed signals, derive an actual target speed signal from the ideal target speed signal and the at least one practical target speed signal for each wheel, compare each actual target speed signal to an associated wheel speed signal to obtain a wheel speed error signal for each wheel, and convert each wheel speed error signal to a clutch control signal, wherein each differential clutch actuator is responsive to the clutch control signal.

According to further aspects of the disclosure, a machine is provided that may include a front axle including a left axle shaft, a right axle shaft, and a front axle differential disposed between the left and right axle shafts, a rear axle including a left axle shaft, a right axle shaft, and a rear axle differential disposed between the left and right axle shafts, a wheel attached to each axle shaft, a main power source for generating torque, and a transmission coupled to the main power source for receiving the torque and having a transmission output shaft operably coupled to the front and rear axles. The machine may further include a front axle differential clutch operably coupled to the front axle differential, the front axle differential clutch including a torque transfer mechanism configured to override the front axle differential, and an actuator operably coupled to the torque transfer mechanism, and a rear axle differential clutch operably coupled to the rear axle differential, the rear axle differential clutch including a torque transfer mechanism configured to override the rear axle differential, and an actuator operably coupled to the torque transfer mechanism. A wheel speed sensor may be associated with each wheel and adapted to generate a wheel speed signal, and an orientation sensor may be responsive to an orientation of the articulated truck from which a yaw rate signal is derived. The machine may further include a control unit adapted to produce a corner speed estimate signal for each wheel having a value responsive to the wheel speed signals and yaw rate signal, produce an ideal target speed signal having a value responsive to the corner speed estimate signal associated with each wheel, produce at least one practical target speed signal for each wheel having a value responsive to the wheel speed signals, derive an actual target speed signal from the ideal target speed signal and the at least one practical target speed signal for each wheel, compare each actual target speed signal to an associated wheel speed signal to obtain a wheel speed error signal for each wheel, and convert each wheel speed error signal to a clutch control signal, wherein each differential clutch actuator is responsive to the clutch control signal.

DETAILED DESCRIPTION

Figure 1:
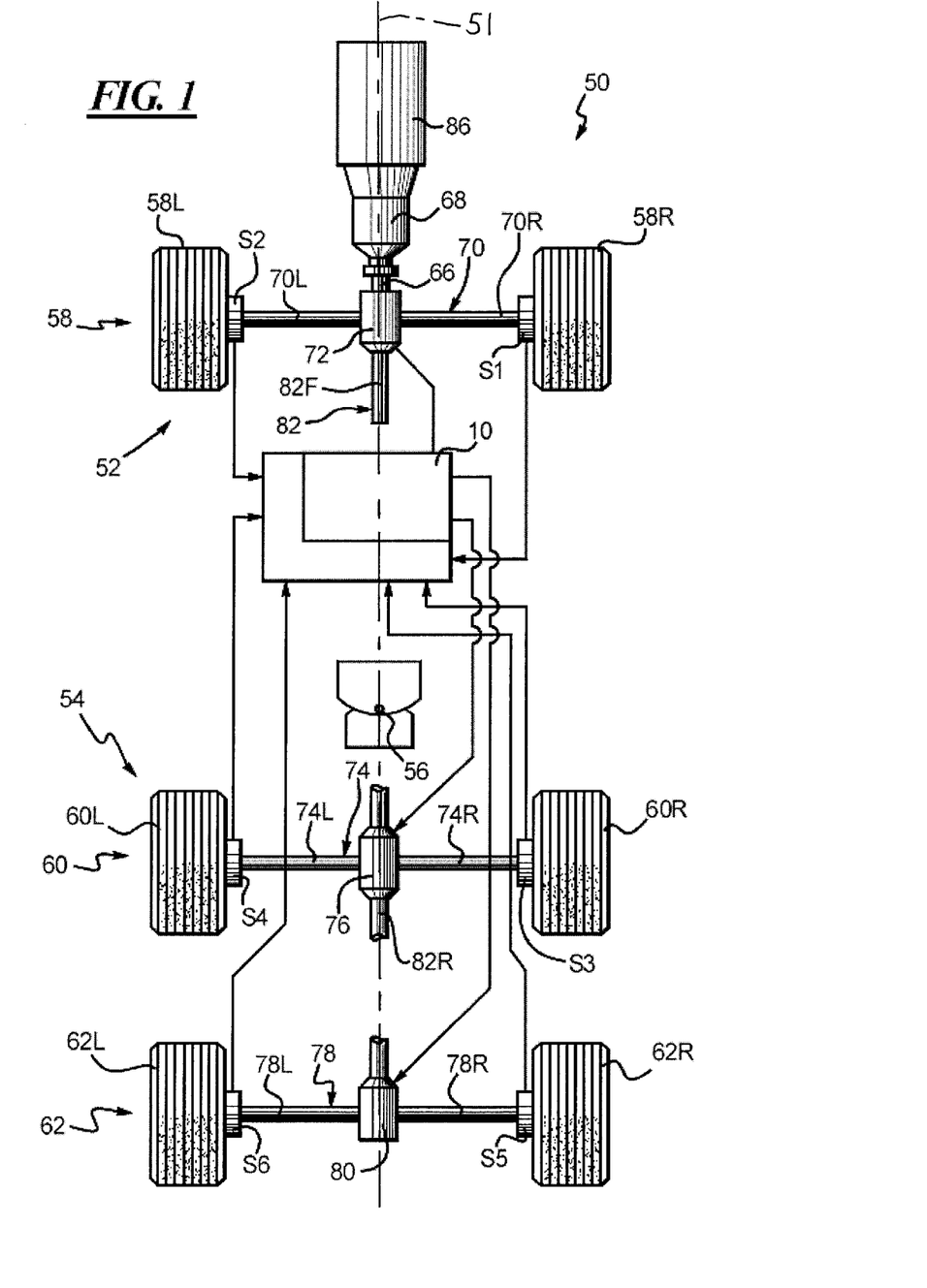
FIG. 1 is a schematic diagram of an articulated machine having a traction optimization system according to the present disclosure.

Referring now to the drawings, and with specific reference to FIG. 1, a machine constructed in accordance with this disclosure is generally referred to by reference numeral 50. The machine 50 includes a differential clutch controller that may be optimized to reduce wheel spin during acceleration and wheel slip during deceleration. While the machine 50 is depicted as an articulated truck, it is to be understood that the teachings of this disclosure can be applied to any number of different types of wheeled machines used in construction, transportation, agriculture, and industry. For example, the machine may be a motor grader, wheel harvester, rotary mixer, wheel skidder, four-wheel drive vehicle, quarry construction truck, large mining truck, wheel loader, wheel tractor scraper, or other machine.

As shown, the machine 50 includes a front cab 52 and a rear dump body 54 hinged together by an articulation joint 56. The articulation joint 56 permits relative movement about a vertical axis, enabling the machine 50 to be steered. The front cab 52 includes a front wheel set 58, while the rear dump body 54 includes a center wheel set 60 and a rear wheel set 62. Each wheel set includes at least one left wheel and one right wheel. In the illustrated embodiment, therefore, the front wheel set 58 includes a front left wheel 58L and a front right wheel 58R; the center wheel set 60 includes a center left wheel 60L and a center right wheel 60R; and the rear wheel set 62 includes a rear left wheel 62L and a rear right wheel 62R.

A lower drive assembly operably couples the wheels to a transmission 68. In the embodiment illustrated in FIG. 1, the lower drive assembly includes a series of axle sets and differentials. Accordingly, a front axle set 70 includes left and right half-axles 70L, 70R coupled by a front differential 72. A center axle set 74 includes left and right half-axles 74L, 74R coupled by a center differential 76. Finally, a rear axle set 78 includes left and right half-axles 78L, 78R coupled by a rear differential 80. The front, center, and rear axle sets 70, 74, 78 may be operably coupled to a drive shaft 82, which in turn is coupled to an output shaft 66 of the transmission 68. As is generally known, the front, center, and rear differentials 72, 76, 80 allow side-to-side or cross-axle wheel speed differences, which equalizes the torque delivered to each wheel of an axle and improves steering through corners.

Figure 3:
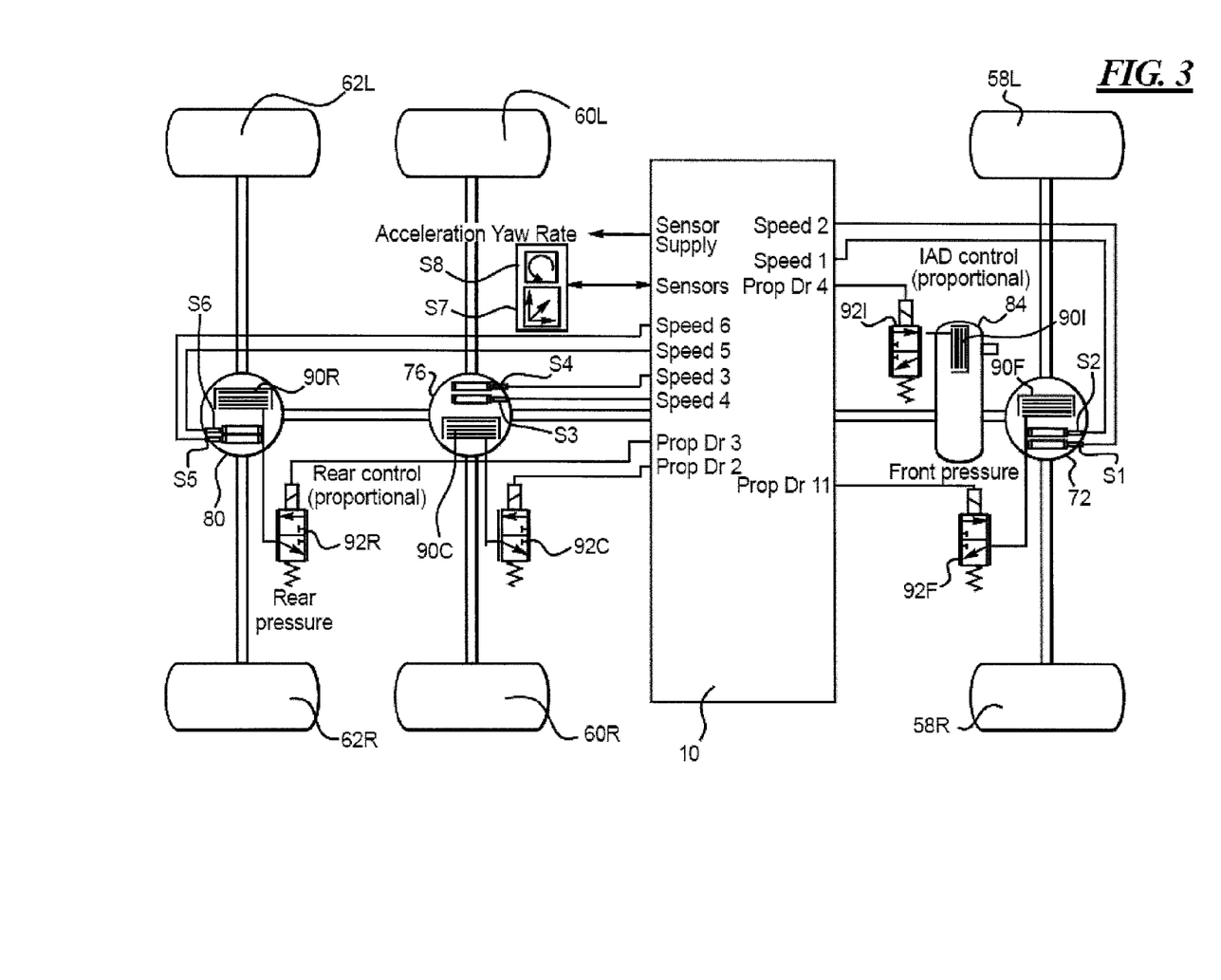
FIG. 3 is a schematic diagram of a machine showing additional details of the traction optimization system.

The drive shaft may include a front section 82F and a rear section 82R operably coupled by an inter-axle differential 84 (FIG. 3). The inter-axle differential 84 permits different wheel speeds between the front axle set 70 and the center and rear axle sets 74, 78. The transmission 68 may be operatively coupled to a main power source 86 for generating torque.

Figure 2:
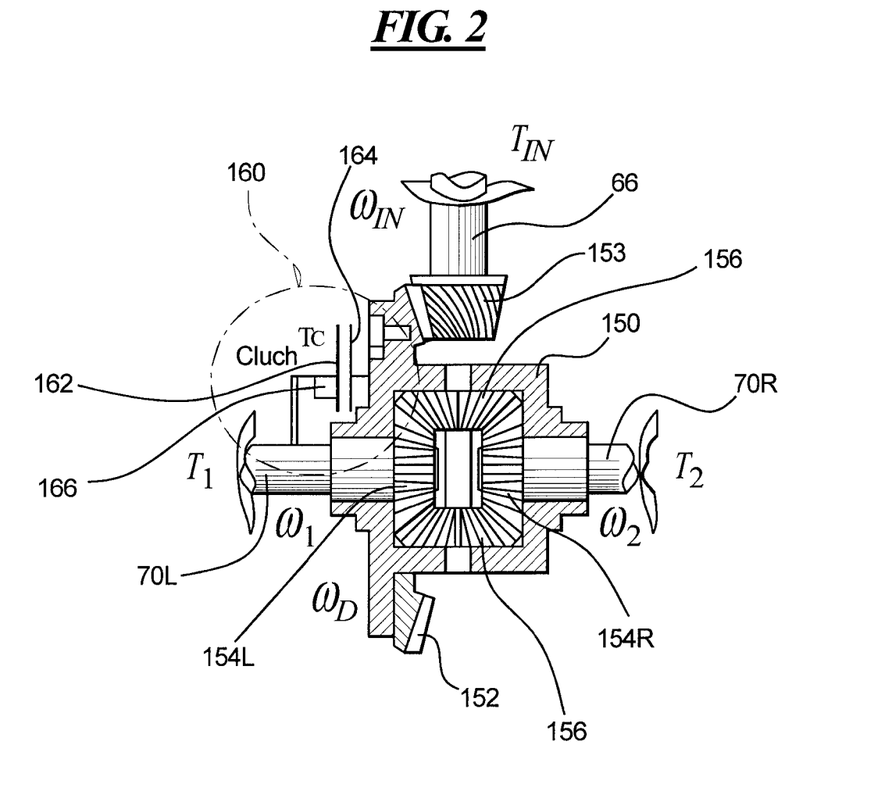
FIG. 2 is an enlarged schematic of a differential having a differential clutch.

FIG. 2 illustrates in greater detail an exemplary embodiment of the front differential 72. The front differential 72 includes a housing 150. A ring gear 152 may be attached to the housing 150 and configured to engage a pinion gear 153 disposed on the end of the transmission output shaft 66. Spider gears 156 may be disposed inside and rotate with the housing 150. The spider gears 156 engage left and right side gears 154L, 154R coupled to the left and right half-axles 70L, 70R, respectively. During normal operation, the left and right half-axles 70L, 70R rotate at equal rotational speeds in response to rotation of the housing 150. When the machine is turning or the wheels experience different levels of traction, the spider gears 156 rotate to allow the wheels to rotate at different speeds.

A lockup mechanism, such as a differential clutch 160, may be provided to override the differential 72, thereby creating direct engagement between the ring gear 152 and the left and right half-axles 70L, 70R. The differential clutch 160 may include a torque transfer mechanism, such as clutch plates, to override the normal, open operation of the differential. In the illustrated embodiment, the differential clutch 160 includes a first clutch plate 162 coupled to the left half-axle 70L and a second clutch plate 164 coupled to the ring gear 152. A piston 166 may be configured to apply engagement pressure to the clutch plates 162, 164, thereby to selectively engage the clutch. The piston 166 may be further controlled to partially engage the clutch. For a partially-engaged clutch, the degree to which the clutch is engaged will determine the amount of torque across the clutch, and therefore the torque differential between the half-axles, which in turn controls the amount of torque delivered to the wheels 58L, 58R (FIG. 1). When fully engaged, the clutch 160 attempts to equalize the wheel speeds, with arbitrary torque differences determined primarily by the surface friction conditions on each side of the machine, and also by whether the machine is moving in a straight line or turning.

While FIG. 2 illustrates a clutch 160 having clutch plates 162, 164, it will be appreciated that other lockup mechanisms may be used. For example, a clutch having dogs or other torque transfer mechanisms may be used.

Returning to FIGS. 1 and 3, the center differential 76, rear differential 80, and inter-axle differential 84 may be similar to the front differential 72 described above. Furthermore, each differential may be provided with a lock-up mechanism, such as a clutch, to override the differential. Accordingly, the machine 50 may have a front differential clutch 90F, a center differential clutch 90C, a rear differential clutch 90R, and an inter-axle differential clutch 90I. The front, center, and rear clutches 90F, 90C, 90R facilitate mobility in situations where there are variations in surface friction from side to side, while the inter-axle clutch 90I facilitates mobility in situations where the surface friction varies from front to rear. The inter-axle clutch 90I also improves mobility when the machine 50 encounters a steep grade, in which the load weight transfers from front to rear. In the exemplary embodiment, these differential clutches are hydraulically actuated, and therefore include respective valves 92F, 92C, 92R, and 92I for controlling the amount of hydraulic fluid delivered to the clutch pistons, thereby to control the amount of engagement pressure applied to the clutch plates. Alternatively, the differential clutches may be actuated using other means, such as air.

A controller is provided for generating clutch control signals for each hydraulic valve 92F, 92C, 92R, 92I, thereby to partially or fully engage the differential clutches 90F, 90C, 90R, 90I. FIG. 3 shows a schematic of an exemplary electrical system for the machine 50. The electrical system provides a central control unit 10 and a plurality of sensors and/or monitors for determining the dynamics of the vehicle at any particular point in time. The central control unit 10 receives feedback from the sensors and generates control signals for each hydraulic valve associated with a differential clutch. By controlling differential clutch engagement, the central control unit 10 may reduce wheel spin or slip in the event one or more wheels encounter a low traction surface.

Multiple sensors may be used to provide feedback to the central control unit 10. In the exemplary embodiment, the electrical system includes six wheel speed sensors S1-S6. The wheel speed sensors S1-S6 may detect the rotational velocity of the wheels directly, or may sense parameters from which wheel speeds may be inferred. One example of indirectly detecting wheel speed would be to provide sensors that measure the rotational velocity of components coupled to the wheels, such as components of a differential. One sensor may detect the speed of a differential side gear, such as side gear 154L. Another sensor may detect the speed of the input, such as ring gear 152. The ring gear speed is equal to the average of the two side gear speeds. Accordingly, the speed of side gear 154R may be determined by subtracting the speed of the left side gear 154L from twice the speed of the ring gear 152. The side gears 154L, 154R are directly coupled to the half axles carrying the wheels, and therefore their speeds may be used to infer the actual wheel speeds. Suitable proportional factors may be used to account for any reduction gear arrangements used between the half-axles and the wheels.

It may be possible to eliminate one or more of the wheel speed sensors S1-S6 in certain applications. In the illustrated articulated truck, for instance, the wheel speed sensors for one of the central or rear axles may be omitted, in which case the clutches for both the sensed and un-sensed axles would be controlled in common. Eliminating sensors from the center or rear axles may slightly reduce overall controller performance but also reduce costs.

An orientation sensor may be provided for providing information regarding an orientation of the machine with respect to a base reference. For example, the base reference may be a reference axis such as a longitudinal axis 51 extending along a length of the machine 50, and the orientation sensor may detect an angle of orientation of the machine 50 about that axis. Alternatively, the machine orientation may be measured with respect to a fixed, rather than relative, base reference. Exemplary orientation sensors include a yaw sensor, a yaw rate sensor, magnetic compass chips, or other devices from which the orientation of the machine may be derived. The illustrated embodiment shows a yaw rate sensor S8, which senses an angular velocity, or yaw rate, of the machine. For an articulated truck, the yaw rate sensor S8 may measure the yaw rate of the front cab 52, from which the yaw rate of the rear dump body 54 may be estimated if needed. Alternatively, the machine may include a second yaw rate sensor for measuring yaw rate of the rear dump body 54.

The use of a yaw rate sensor S8, may be advantageous over the articulation angle sensors used in conventional articulated machines. If an articulation angle sensor is used, relative wheel speeds from front to back and side to side may be determined using machine geometry. These calculations, however, may assume that the machine is not sliding, or may be modified to allow for some estimated amount of sliding. A yaw rate sensor, however, directly provides the relative wheel speeds without needing to consider machine geometry, or whether the machine is sliding. Instead, expected wheel speeds may be obtained using the yaw rate and machine track width.

The machine 50 may use existing or additional sensors from which a direction signal may be derived indicating the direction of travel of the machine 50. In the illustrated embodiment, for example, an optional gear sensor S9 may be provided for sending whether the transmission is in reverse or a forward gear, from which it may be inferred that the machine is traveling in reverse or forward. The control unit may use direction of travel information to properly apply the yaw rate to modify corner speed estimates, as better understood below. Information regarding travel direction, however, may be derived from one of the other sensors, such as wheel speed sensors that also sense direction of rotation. Direction of travel may also be derived from wheel speed and yaw rate information. In some embodiments of the central control unit 10, the actual direction of machine travel may not be required to obtain corner speed estimates, and therefore a direction sensor is merely optional.

An acceleration sensor S7 may also be provided for detecting acceleration of the machine, however this sensor is also optional. Whether the machine is accelerating or decelerating determines whether upper or lower corner speed estimates are used, as understood more fully below. The acceleration or deceleration of the machine, however, may be determined by a throttle sensor that provides a throttle position signal, a brake sensor that provides a brake pedal signal, or a combination of the two. Additionally, the acceleration sensor S7 may be omitted, as it is possible to generate adequate corner speed estimates using only the yaw rate and the wheel speeds. The acceleration sensor S7, however, may be advantageous when determining the grade of the surface over which the machine is traveling, as noted more fully below.

Figure 4:
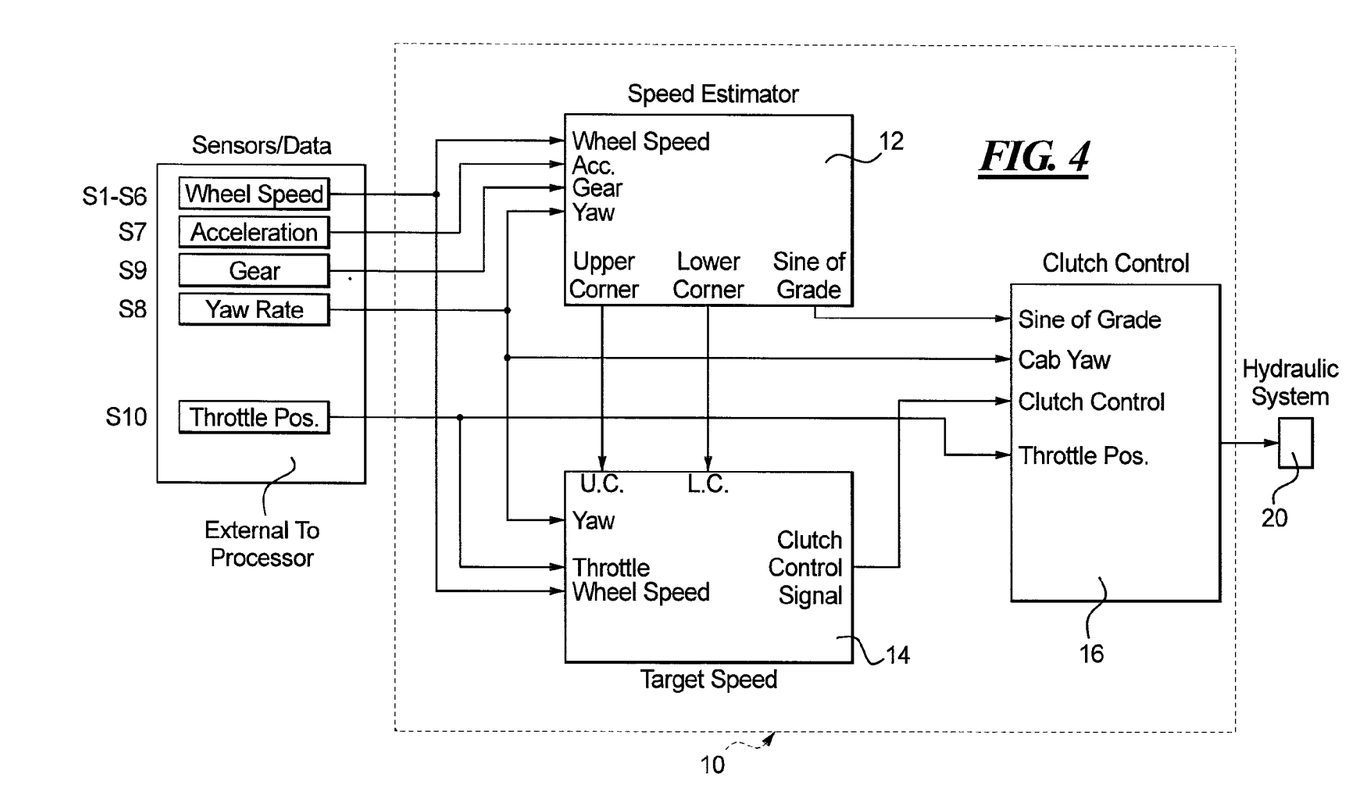
FIG. 4 is an enlarged schematic of a central control unit used in the traction optimization system.

Referring now to FIG. 4, a block diagram of an exemplary control unit 10 is provided. The control unit 10 relies on various vehicle data supplied by a series of sensors S1-S10. As previously discussed with reference to FIG. 3, the sensors include six wheel speed sensors S1-S6 adapted to generate wheel speed signals responsive to observed wheel speeds and a yaw rate sensor S8 adapted to generate a yaw rate signal having a value responsive to a yaw orientation of the machine.

The control unit 10 may include multiple modules, such as a speed estimator module 12, a target speed module 14 and a clutch control module 16 (FIG. 4). The speed estimator module 12 estimates true speed over ground for each wheel and outputs upper and lower corner speed estimates based on measured characteristics of the truck. The target speed module 14 generates ideal, practical and actual targets for minimizing wheel spin and slip based on the estimations provided by the speed estimator module 12. The clutch control module 16 generates differential clutch control signals based on the actual targets provided by the target speed module 14 and outputs the differential clutch control signals to each differential clutch hydraulic valve 92F, 92C, 92R, 92I. Together, these three modules 12, 14 and 16 serve to minimize wheel spin and slip of an articulated truck, and to optimize control of a hydraulic system 20 that operates the inter-axle and cross-axle differential clutches.

Figure 5:
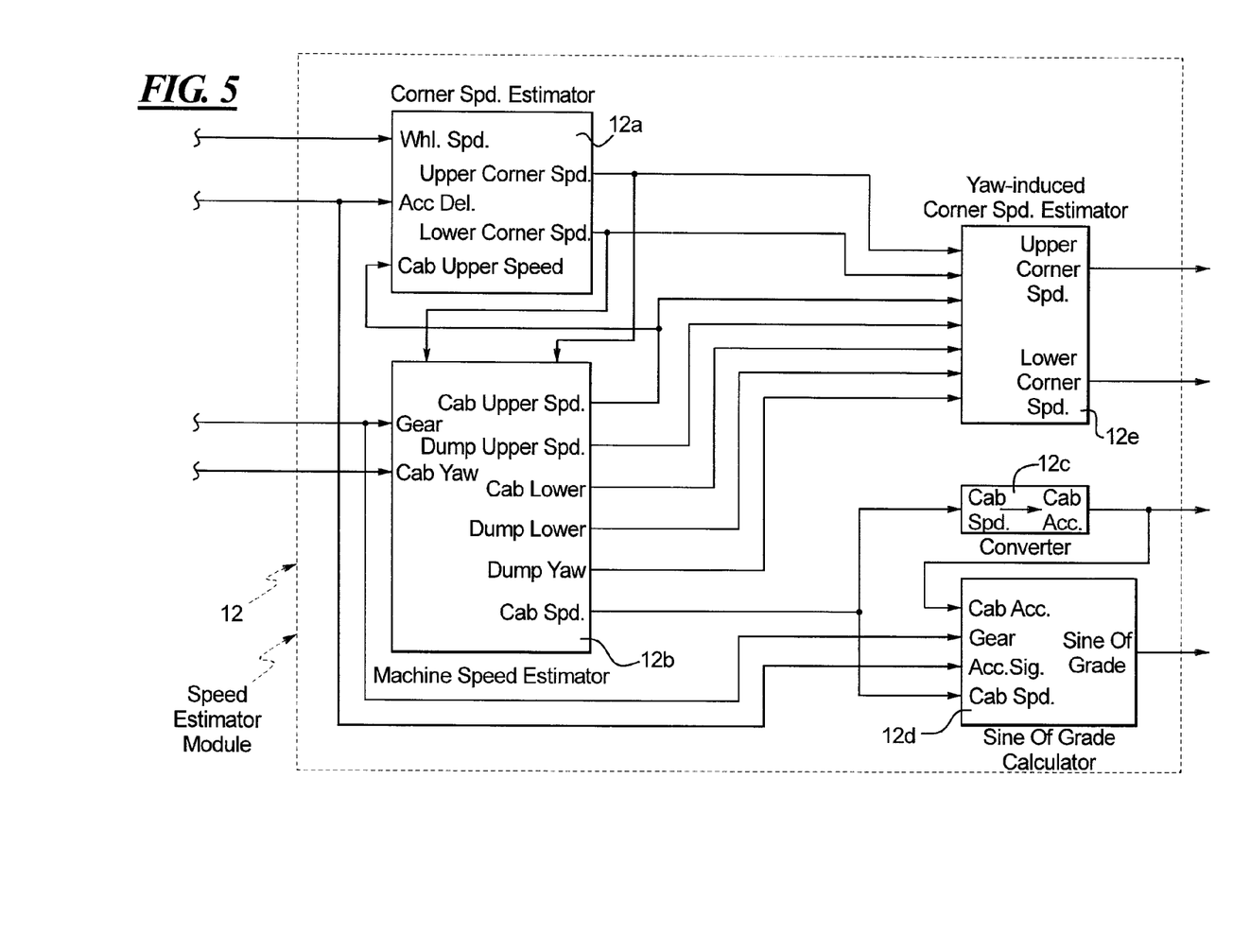
FIG. 5 is an enlarged schematic of a speed estimator module used in the central control unit of FIG. 4.

Referring now to FIG. 5, an exemplary speed estimator module 12 is provided in more detail. The speed estimator module 12 includes a corner speed estimator 12a, a machine speed estimator 12b, a converter 12c, a sine of grade calculator 12d and a yaw-induced corner speed estimator 12e.

As used herein, the term "corner speed" is used to identify the true speed over the ground of an axle end for a particular wheel. Preliminary corner speed estimates are calculated at the corner speed estimator 12a based on observed data and corner speed estimate signals are generated. More specifically, observed wheel speed, machine acceleration and the estimated upper speed estimate of the cab 52 are input into the corner speed estimator 12a to calculate acceleration and deceleration estimates. From the acceleration and deceleration estimates, the corner speed estimator 12a calculates upper and lower corner speed estimates, respectively. The corner speed estimator 12a also provides feedback loops to monitor previous upper and lower corner speed estimates and to make any adjustments accordingly. The updated upper and lower corner speed estimates are then transmitted to the machine speed estimator 12b and the yaw-induced corner speed estimator 12e for further processing.

The machine speed estimator 12b serves to estimate corner speed estimates for each of the cab 52 and dump body 54 based on the observed data. In particular, the machine speed estimator 12b observes gear data, the yaw rate of the cab, and the corner speed estimates provided by the corner speed estimator 12a to output various signals to the yaw-induced corner speed estimate estimator 12e. These signals include upper and lower corner speed estimate signals for the cab 52, upper and lower corner speed estimate signals for the dump body 54, and the estimated yaw rate signal for the dump body 54.

The machine speed estimator 12b additionally estimates the overall cab speed by taking the average of the upper and lower corner speed estimates of the cab. The estimated cab speed is then transmitted to the converter 12c, which converts the cab speed into cab acceleration information. Both cab speed and cab acceleration information is transmitted to the sine of grade calculator 12d. The sine of grade calculator 12d uses the cab speed and acceleration information in conjunction with observed gear and acceleration data to establish thresholds for use with the clutch control module 16, as will be discussed more specifically below.

The yaw-induced corner speed estimator 12e considers the information provided by the corner speed estimator 12a and the machine speed estimator 12b, and determines more filtered and finalized upper and lower corner speed estimate signals. Specifically, the yaw-induced corner speed estimator 12e determines speed differentials induced by cab 52 and dump body 54 yaw rates. The yaw-induced speed differentials are then used to compare and, if necessary, modify each of the corner speed estimates provided by the corner speed estimator 12a. For instance, the upper corner speed estimate of each front cab wheel (i.e., the front left wheel 58L and front right wheel 58R), is compared to the yaw-induced speed differential calculations. Any necessary adjustments are made to the upper corner speed estimates for the front cab wheels according to the observed cab yaw rate and the state of the gear, for example, forward or reverse. Similar considerations are made to the upper and lower corner speed estimates of the dump body wheels, or center left wheel 60L, the center right wheel 60R, the rear left wheel 62L, and rear right wheel 62R. The resulting upper and lower corner speed estimate signals of the six wheels are then transmitted to the target speed module 14 for further processing.

Using the corner speed estimate signals provided by the speed estimator module 12, the target speed module 14 is able to generate two sets of target speed signals. The first set of target speed signals is directed toward preventing unnecessary wheel spin (i.e., traction control), and the second set of target speed signals is directed toward preventing unnecessary wheel slip (i.e., anti-lock braking). As shown in the exemplary schematic of FIG. 6, the top half is responsible for generating anti-spin targets while the bottom half is related to generating anti-slip targets.

Figure 6:
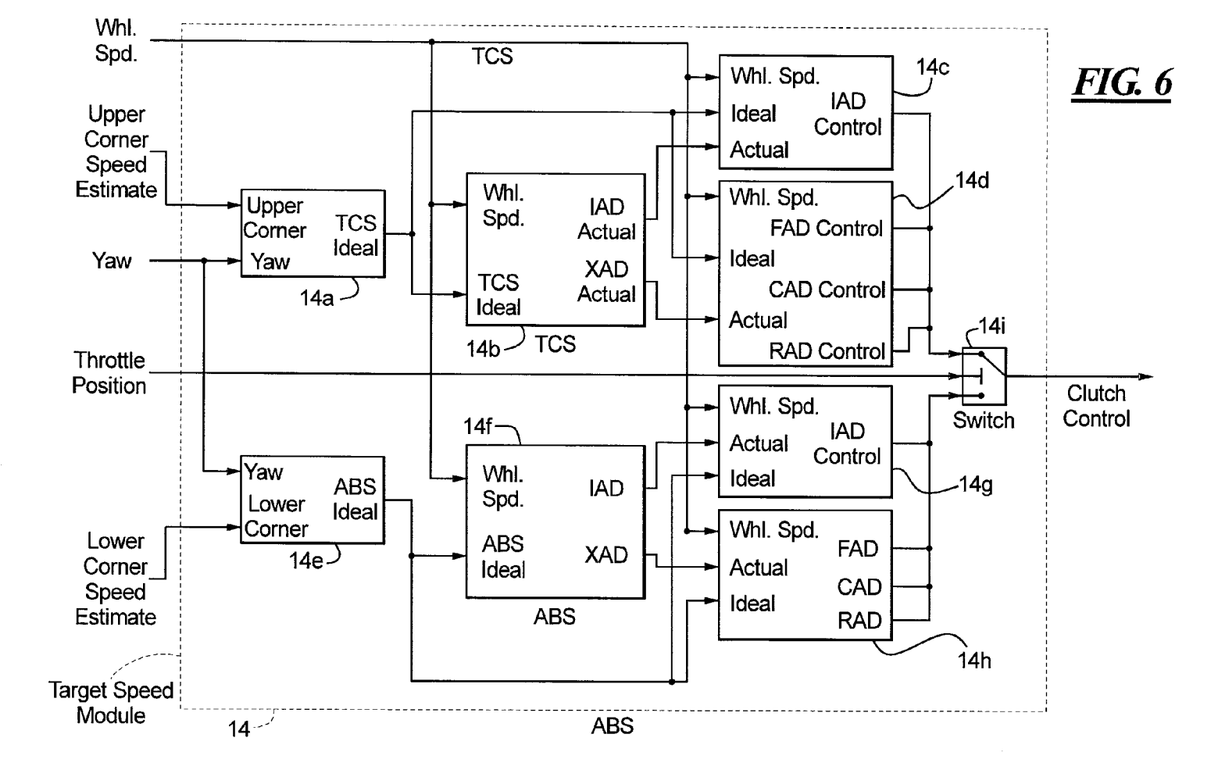
FIG. 6 is an enlarged schematic of a target speed module used in the central control unit of FIG. 4.

With respect to the anti-spin targets, and referring specifically to the top half of FIG. 6, the target speed module 14 provides an ideal target generator 14a, an actual target generator 14b, and control signal generators 14c, 14d. The ideal target generator 14a calculates an ideal target signal based on the upper corner speed estimate signals and the observed cab yaw rate signal. More specifically, ideal vehicle characteristics are applied to the estimated yaw-induced upper corner speed estimate signals of each wheel and output to the actual target generator 14b as ideal target signals. The ideal target speed signal may represent a wheel speed that results in maximum tractive efficiency for the current ground speed and actual ground conditions.

To optimize traction control, the target speed module 14 generates at least one practical target speed signal for each wheel, compares the practical target speed signal(s) to the ideal target speed signal, and selects the maximum of the practical and ideal target speed signals as the actual target speed signal. The practical target speed signals relate to the instantaneous wheel speeds coupled with the physical arrangements on the machine. For example, the clutch cannot limit wheel spin on the inner side wheel before it reaches the speed of outer side wheel during a turn. Another practical target speed signal may be generated if the engine speed is close to the maximum governed speed for a particular gear. Still other practical speed targets may be based on the configuration of the clutch actuators. These and other practical considerations may be used to formulate one or more practical target speed signals for each wheel.

Figure 7:
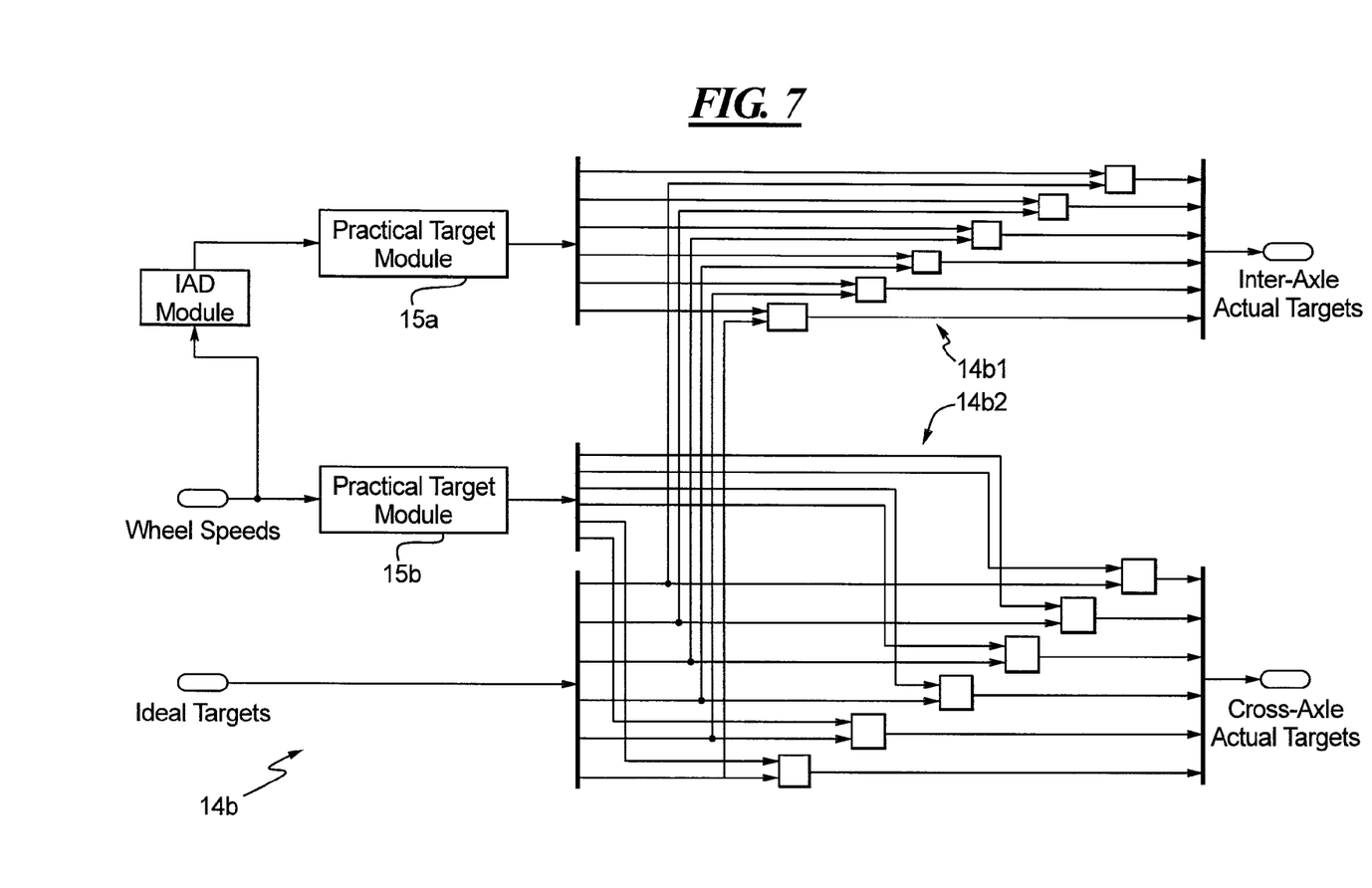
FIG. 7 is an enlarged schematic of a traction control system used in the target speed module of FIG. 6.

As shown in FIG. 7, the actual target generator 14b includes inter-axle and cross-axle practical target modules 15a, 15b for converting the observed wheel speed signals into inter-axle and cross-axle practical target speed signals. In particular, to obtain the inter-axle practical target speed signals, the observed wheel speed signals are applied to an expression characteristic of the vehicle's inter-axle dynamics, and subsequently modified with offsets, gains and practical constraints. Cross-axle practical target speed signals are determined by applying offsets, gains and practical constraints directly onto the observed wheel speeds. Each of the resulting inter-axle practical target speed signals is compared to its corresponding ideal target speed signal as shown by the first array of signals 14b1. The resulting maximum target values are designated and output as inter-axle actual target speed signals. Similarly, each of the resulting cross-axle practical target speed signals is compared to its corresponding ideal target speed signal as shown by the second array of signals 14b2. The resulting maximum target values are designated and output as cross-axle actual target speed signals.

Turning back to FIG. 6, observed wheel speed signals, ideal target speed signals, and actual target speed signals are transmitted to each of the control signal generators 14c, 14d. The inter-axle control signal generator 14c analyzes errors between the observed wheel speed signals, the ideal target speed signals, and the actual target speed signals, and generates an inter-axle control signal for correcting the errors. Similarly, the cross-axle control signal generator 14d analyzes errors between the observed wheel speed signals, the ideal target speed signals, and actual target speed signals for each axle, and generates a cross-axle control signal for correcting the errors associated with each axle.

With respect to the anti-slip targets, and with reference to the bottom half of FIG. 6, the target speed module 14 provides an ideal target generator 14e, an actual target generator 14f, and control signal generators 14g, 14h. The ideal target generator 14e calculates an ideal target speed signal based on the lower corner speed estimate signal and observed cab yaw rate signal. More specifically, ideal vehicle characteristics are applied to the estimated yaw-induced lower corner speed estimate signals of each wheel and output to the actual target generator 14f as ideal target speed signals.

Figure 8:
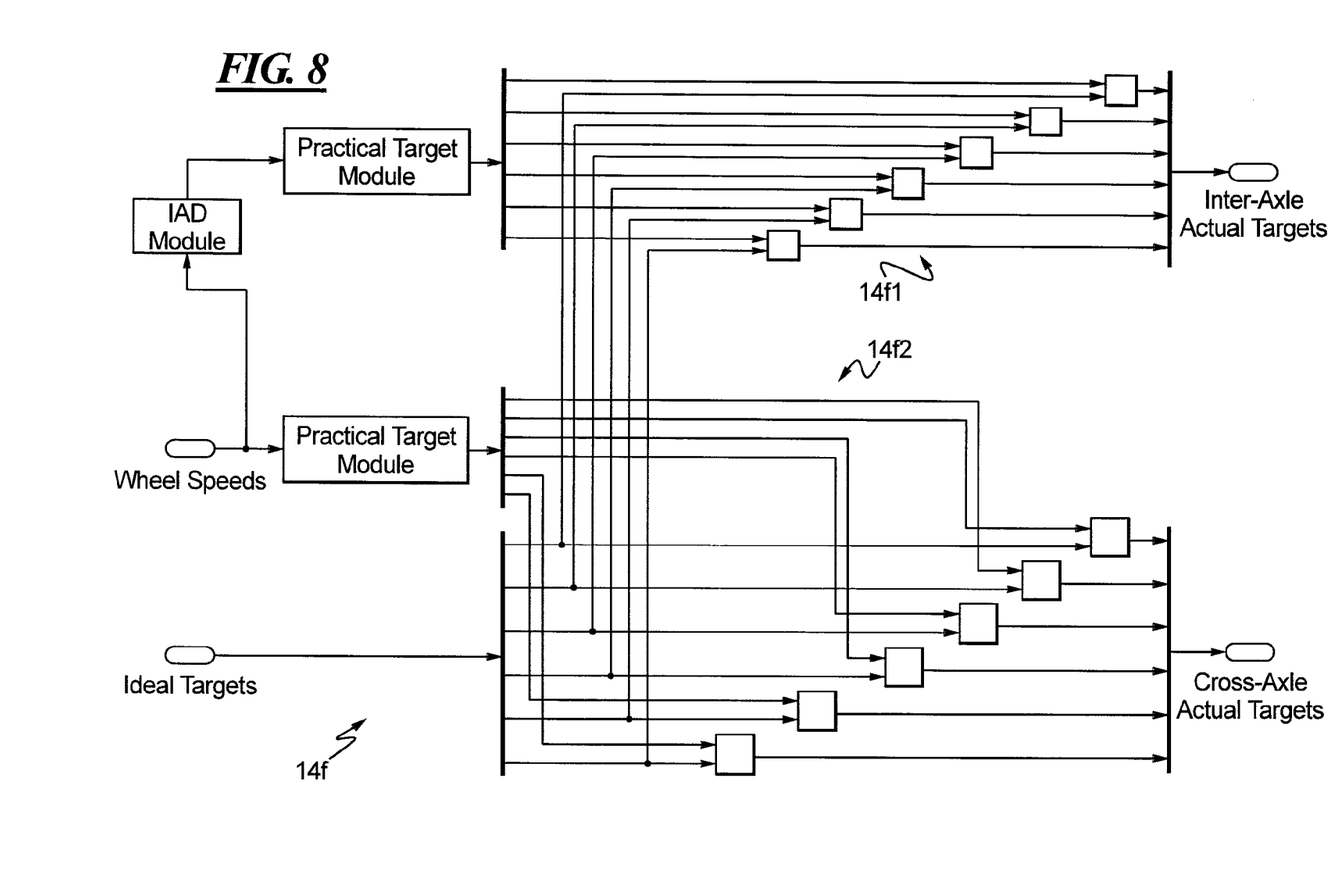
FIG. 8 is an enlarged schematic of an anti-lock brake system used in the target speed module of FIG. 6.

To optimize anti-lock braking, the target speed module 14 generates a practical target speed signal, compares the practical target speed signal to the ideal target speed signal, and selects the minimum of the practical and ideal target speed signals as an actual target speed signal for the controller. As shown in FIG. 8, the actual target generator 14f converts the observed wheel speed signal into inter-axle and cross-axle practical target speed signals. In particular, to obtain the inter-axle practical target speed signals, the observed wheel speed signals are applied to an expression characteristic of the vehicle's inter-axle dynamics, and subsequently modified with offsets, gains and practical constraints. Cross-axle practical target speed signals are determined by applying offsets, gains and practical constraints directly onto the observed wheel speed signals. Each of the resulting inter-axle practical target speed signals is compared to its corresponding ideal target speed signal as shown by the first array of signals 14f1. The resulting minimum target values are designated and output as inter-axle actual target speed signals. Similarly, each of the resulting cross-axle practical target speed signals is compared to its corresponding ideal target speed signal as shown by the second array of signals 14f2. The resulting minimum target values are designated and output as cross-axle actual target speed signals.

In the foregoing description, the actual target speed signals are derived by selecting the maximum (for traction control) or minimum (for anti-lock braking) of the ideal and practical target speeds. The actual target speed signals, however, may be derived using other processes. For example, the actual target speed signal may be derived by using a combination or "blend" of the ideal and practical target speed signals. An algorithm, ratio, or other function may be used to combine the ideal and practical target speed signals. In certain situations, the function used to obtain the blended actual target signal may still output a maximum or minimum of the ideal and practical target speed signals, but otherwise may output a signal derived from both signals.

Turning back to FIG. 6, observed wheel speed signals, ideal target speed signals, and actual target speed signals are transmitted to each of the control signal generators 14g, 14h. The inter-axle control signal generator 14g analyzes errors between the observed wheel speed signals, the ideal target speed signals, and the actual target speed signals, and generates an inter-axle control signal for correcting the errors. Similarly, the cross-axle control signal generator 14h analyzes errors between the observed wheel speed signals, the ideal target speed signals, and the actual target speed signals for each axle, and generates a cross-axle control signal for correcting the errors associated with each axle.

Once anti-spin and anti-slip control signals based on actual target speed signals have been generated, the switch 14i of FIG. 6 determines which control to output based on the observed throttle position. For instance, if the observed throttle position is open, which indicates an operator's intent to accelerate, the switch 14i may output anti-spin control signals to maximize traction. Alternatively, if the observed throttle position is closed, which may indicate an operator's intent to coast, decelerate or stop, the switch 14i may output anti-slip control signals to minimize slip. In any event, the resulting control signals are then transmitted to the clutch control module 16 of FIG. 4 for further processing.

Figure 9:
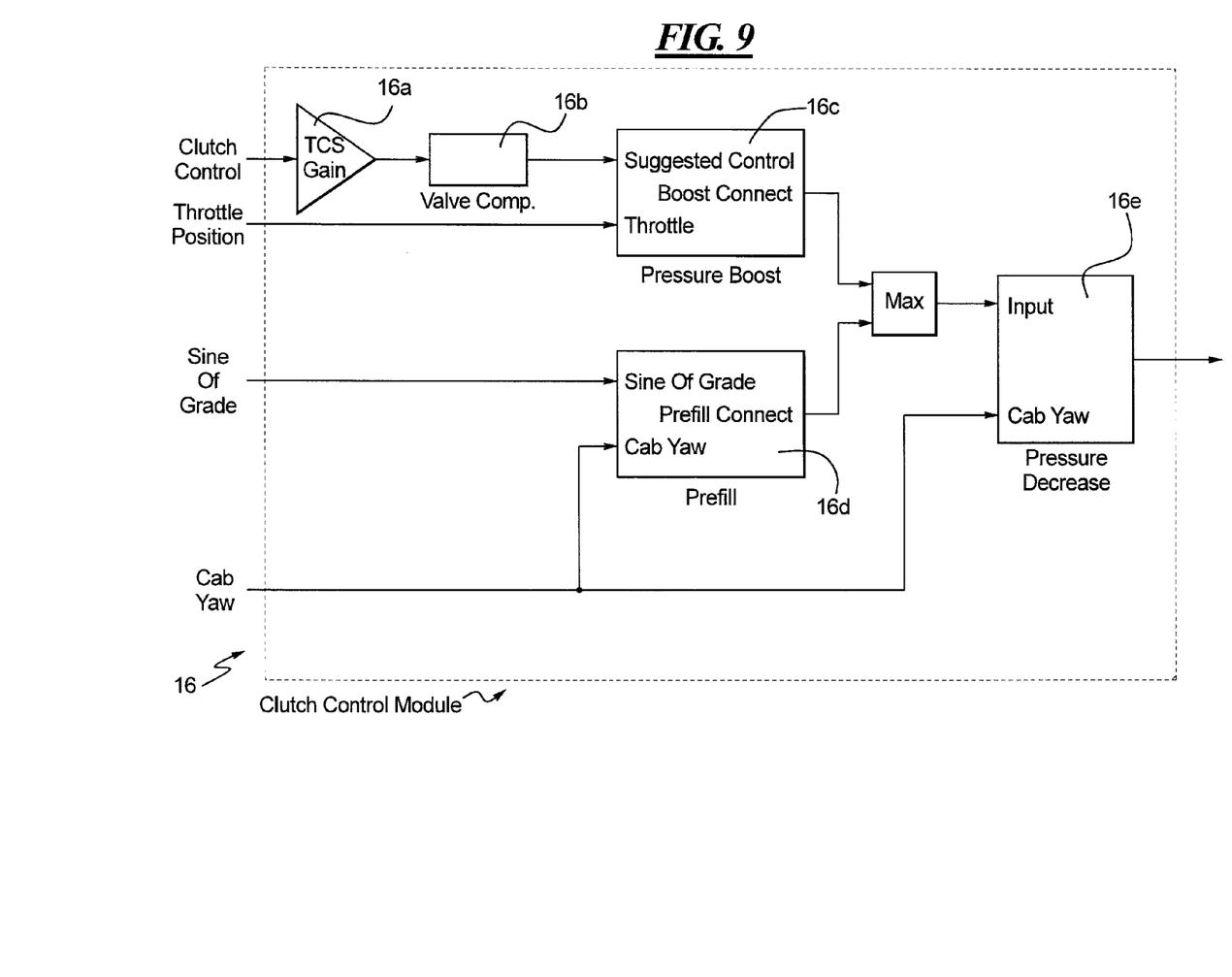
FIG. 9 is an enlarged schematic of a clutch control module used in the central control unit of FIG. 4.

The clutch control module 16 serves to convert the control signals provided by the target speed module 14 into physical actuation of corresponding differential clutches 90F, 90C, 90R, 90I. Referring now to FIG. 9, the clutch control module 16 may provide the control unit 10 with a system gain 16a and a valve compensator 16b. The system gain 16a serves to increase the overall gain of the control signal so as to be comparable to ranges of clutch pressure. The valve compensator 16b serves to interpolate the signal data, filter the interpolation and compensate for dynamic nonlinearities associated with hydraulic systems such as hysteresis and backlash. The process signal may then be transmitted to a pressure decrease filter 16e, which observes cab yaw rate, observes the new input current, and monitors feedback of a previous control current in view of the input current. Depending on these factors, if necessary, the new input current is adjusted and the pressure decrease filter 16e outputs a new clutch control signal to the hydraulic valves to operate the differential clutches in a manner that optimizes wheel traction.

The clutch control module 16 may optionally include a pressure booster 16c and a prefiller 16d to improve controller performance and resulting improved steering in certain situations. The pressure booster 16c may be used to provide an initial, temporary increase in the differential clutch control signal to reduce power dissipation in the clutch. The pressure booster 16c compares the process signal to feedback from a previously applied clutch control signal. Based on this comparison and the observed throttle position, the current, or pressure to be applied, is boosted accordingly. The pressure boost is temporary, in that it is immediately reduced in a controlled manner. The pressure boost will cause the wheels speeds to equalize. The magnitude of the pressure boost may be limited to a fractional increase to improve the ability of the clutch to slip should the machine move to a higher friction surface, thereby increasing the ability to steer the machine.

The prefiller 16d may be used to improve performance over steep inclines. As shown in FIG. 9, the prefiller 16d observes the cab yaw rate and the sine of grade provided by the calculator 12d discussed above with respect to FIG. 5. The prefiller may apply a prefill current when the observed sine of grade is beyond a set threshold indicating a significant incline. Conversely, if there is no detected incline and the sine of grade is below a predetermined threshold, no prefill current is supplied.

As shown in FIG. 9, the boost and prefill current values provided by the pressure booster 16c and prefiller 16d may be compared, and only the greater of the two current values is transmitted as input current to the pressure decrease filter 16e.

INDUSTRIAL APPLICABILITY

The disclosed differential clutch controller, as well as a machine having a controller configured to minimize wheel slip or spin, is well-suited for improving steering. Exemplary machines that may benefit from the controller, include motor graders, wheel harvesters, rotary mixers, wheel skidders, four-wheel drive vehicles, quarry construction trucks, large mining trucks, wheel loaders, wheel tractor scrapers, and articulated trucks.

The controller improves steering by continuously estimating the true speed of each wheel over the ground as a reference from which various corner speed targets are generated. In particular, the controller generates ideal wheel speed targets and practical wheel speed targets based on the machine's detected wheel speed and yaw rate. The controller then selectively determines actual wheel speed targets based on the ideal and practical target values, and outputs the appropriate controls to the corresponding differential clutches. The cross-axle actual speed targets more improve traction side-to-side differences in traction, such as where one or more wheels on one side of the machine contact a low friction surface while the wheels on the other side of the machine contact a higher friction surface. In these conditions, the cross-axle actual speed targets identify either maximum wheel speeds during acceleration (to minimize spin) or minimum wheel speeds during deceleration (to minimize slip). The inter-axle actual speed targets improve traction in front-to-rear differences in traction, such as when the machine is moving uphill and the carried load shifts from the front of the machine to the back, thereby increasing the tendency of the front wheels to spin. In such conditions, the inter-axle actual speed targets identify either maximum wheel speeds during acceleration (to minimize spin) or minimum wheel speeds during deceleration (to minimize slip). The differential clutch controller is more robust and maximizes traction for all environments and operating speeds, while minimizing the negative impacts on steering of the machine in low traction environments. Steering of machines using the controller disclosed herein is significantly improved over conventional manually operated differential clutches.

What is claimed is:

1. A method of operating a machine having a cab and a rear body connected by an articulating joint for relative movement about a vertical axis, wherein the cab has a front axle set having a first front axle with a first front traction device and a second front axle with a second front traction device coupled by a front differential having a front clutch and the rear body has a rear axle set having a first rear axle with a first rear traction device and a second rear axle with a second rear traction device coupled by a rear differential having a rear clutch, wherein the machine is steered by changing an angle between the cab and the rear body about the vertical axis in response to an input at a steering device, and wherein a main power source of the machine is operatively coupled to the front differential and the front differential is operatively coupled to the rear differential such that the front axle set and the rear axle set both receive torque output by the main power source, the method comprising:
   sensing a rotational speed each of the traction devices with a corresponding speed sensor to determine a sensed rotational speed signal for each the traction devices;
   sensing a first rate of change of an orientation of the cab relative to an operating surface to determine a sensed rate of change of orientation of the cab;
   determining a second rate of change of an orientation of the rear body relative to the operating surface as a function of the sensed first rate of change of the orientation of the cab and the sensed rotational speeds of the traction devices;
   determining a speed of the machine relative to the operating surface as a function of the sensed rotational speed signals for the traction devices;
   determining a corner speed signal associated with each of the front traction devices as a function of the speed of the machine and the sensed first rate of change of orientation of the machine and determining a corner speed signal associated with each of the rear traction devices as a function of the speed of the machine and the second rate of change of the orientation of the rear body, the corner speed signal for each of the traction devices being indicative of a speed of the corresponding traction device relative to the operating surface;
   determining an ideal target speed signal for each of the traction devices as a function of the corner speed signal associated with the traction device;
   comparing the sensed rotational speed signal for each of the traction devices with the ideal target speed signal for the traction device; and
   selectively reducing a rotational speed of one of the traction devices if the sensed rotational speed signal for the traction device is greater than the ideal target speed signal for the traction device by actuating a corresponding one of the front clutch and the rear clutch to engage a corresponding one of the front differential and the second differential.

2. The method of claim 1, wherein sensing the first rate of change of an orientation of the machine relative to the operating surface is done with a yaw-rate sensor.

3. The method of claim 1, wherein sensing the first rate of change of an orientation of the machine relative to the operating surface is done with an inertial yaw-rate sensor.

4. The method of claim 1, wherein:
the front differential includes a ring gear that is fixed to a front differential gear housing and operatively connected to an output shaft of a transmission; and
the front clutch is interconnected between the ring gear and one of the first front axle and the second axle.

5. The method of claim 1, further including:
determining a practical target speed signal associated with each of the traction-devices as a function of the sensed rotational speed of the other of the traction devices coupled to the corresponding one of the front differential and the rear differential;
comparing the ideal target speed signal and the practical target speed signal of each of the traction devices; and
selectively reducing the rotational speed of one of the traction devices to be equal to a speed that is closer to the greater one of the ideal target speed signal and the practical target speed signal by actuating the corresponding one of the front clutch and the rear clutch to engage the corresponding one of the front differential and the second differential.

6. The method of claim 1, wherein each of the speed sensors is configured to measure a rotational speed of a corresponding one of the axles operatively connected to the traction device.

7. The method of claim 1, wherein the plurality of traction devices are a plurality of wheels.

8. The method of claim 1, wherein determining the speed of the machine comprises:
averaging the two sensed rotational speeds of one of the first and second front traction devices and the first and second rear traction devices, resulting in an averaged rotational speed; and
converting the averaged rotational speed to an clutch approximated linear speed of the machine relative to the operating surface.

9. A machine, comprising:
a cab;
a rear body connected to the cab by an articulating joint for relative movement about a vertical axis;
a steering device, wherein the machine is steered by changing an angle between the cab and the rear body about the vertical axis in response to an input at the steering device;
a front axle connected to the cab and including a left axle shaft, a right axle shaft, a first differential gear set disposed between the left and right axle shafts of the front axle, and a front clutch;
a rear axle connected to the rear body and including a left axle shaft, a right axle shaft, a second differential gear set disposed between the left and right axle shafts of the rear axle, and a rear clutch;
a traction device attached to each axle shaft of the front and rear axles for supporting the machine relative to an operating surface;
a transmission coupled to a main power source configured to receive torque and having a transmission output shaft operably coupled to the front and rear axles to provide the torque from the main power source to the front and rear axles;
a traction device speed sensor associated with each traction device configured to generate a signal indicative of a respective rotational speed of the traction device;
a yaw-rate sensor associated with the cab for generating a signal indicative of a first rate of change of an orientation of the cab relative to the operating surface; and
a control system, wherein the control system is configured to:
sense a rotational speed of each of the traction devices with the corresponding traction device speed sensor to determine a sensed rotational speed;
sense the first rate of change of the orientation of the cab relative to the operating surface with the yaw-rate sensor to determine a sensed rate of change of orientation of the cab;
determine a second rate of change of an orientation of the rear body relative to the operating surface as a function of the sensed first rate of change of the orientation of the cab and the sensed rotational speeds of the traction devices;
determine a speed of the machine relative to the operating surface as a function of the sensed rotational speeds of the traction devices;
determine a corner speed signal associated with each of the front traction devices as a function of the speed of the machine and the sensed first rate of change of orientation of the machine, and determining a corner speed signal associated with each of the rear traction devices as a function of the speed of the machine and the second rate of change of the orientation of the rear body, the corner speed signal for each of the traction devices being indicative of the speed of the corresponding traction device relative to the operating surface;
determine an ideal target speed signal for each of the traction devices as a function of the corner speed signal associated with the traction device;
compare the sensed rotational speed signal for each of the traction devices with the ideal target speed signal of the traction device; and
selectively reduce the rotational speed of one of the traction devices if the sensed rotational speed signal for the traction device is greater than the ideal target speed signal for the traction device by actuating a corresponding one of the front clutch and the rear clutch to engage a corresponding one of the first differential gear set and the second differential gear set.

10. The machine of claim 9, wherein the first differential gear set includes a first ring gear that is fixed to a first differential gear housing and operatively connected to an output shaft of the transmission.

11. The machine of claim 9, wherein the second differential gear set includes a second ring gear that is fixed to a second differential gear housing and operatively connected to an output shaft of the transmission.

12. The machine of claim 9, wherein each traction device attached to each axle shaft of the front and rear axles is a wheel.

13. The machine of claim 9, further including:
a center axle connected to the rear body and disposed between the front axle and rear axle, the center axle including a left axle shaft, a right axle shaft, and a third differential gear set disposed between the left and right axle shafts of the center axle, and a center clutch; and
a traction device attached to each of the axle shafts of the center axle for supporting the machine relative to the operating surface.

14. The machine of claim 9, wherein the yaw-rate sensor is an inertial yaw-rate sensor.

15. An articulated truck, comprising:
a cab;
a rear body connected to the cab by an articulation joint for relative movement about a vertical axis;

a steering device, wherein the articulated truck is steered by changing an angle between the cab and the rear body about the vertical axis in response to an input at the steering device;

a front axle connected to the cab and including a left axle shaft, a right axle shaft, a first differential gear set disposed between the left and right axle shafts of the front axle, and a front clutch;

a rear axle connected to the rear body and including a left axle shaft, a right axle shaft, a second differential gear set disposed between the left and right axle shafts of the rear axle, and a rear clutch;

a center axle connected to the rear body, disposed between the front axle and the rear axle and including a left axle shaft, a right axle shaft, a third differential gear set disposed between the left and right axle shafts of the center axle, and a center clutch;

a traction device attached to each axle shaft of the front, center, and rear axles for supporting the articulated truck relative to an operating surface;

a transmission coupled to a main power source configured to receive torque and having a transmission output shaft operably coupled to the front, center, and rear axles to provide the torque from the main power source to the front, center, and rear axles;

a traction device speed sensor associated with each traction device configured to generate a signal indicative of a respective rotational speed of the traction device;

an inertial yaw-rate sensor associated with the cab for generating a signal indicative of a rate of change of an orientation of the cab relative to the operating surface; and a control system, wherein the control system is configured to:
 sense a rotational speed of each of the traction devices with the corresponding traction device speed sensor to determine a sensed rotational speed signal;
 sense a first rate of change of the orientation of the cab relative to the operating surface with the inertial yaw-rate sensor to determine a sensed rate of change of orientation of the cab;
 determine a second rate of change of an orientation of the rear body relative to the operating surface as a function of the sensed first rate of change of the orientation of the cab and the sensed rotational speeds of the traction devices;
 determine a speed of the articulated truck relative to the operating surface as a function of the sensed rotational speed signals;
 determine a corner speed signal associated with each of the front traction devices as a function of the speed of the articulated truck and the sensed first rate of change of orientation of the articulated truck, and determining a corner speed signal associated with each of the center and rear traction devices as a function of the speed of the articulated truck and the second rate of change of the orientation of the rear body, the corner speed signal for each of the traction devices being indicative of the speed of the corresponding traction device relative to the operating surface;
 determine an ideal target speed signal for each of the traction devices as a function of the corner speed signal associated with the traction device;
 compare the sensed rotational speed signal for each of the traction devices with the ideal target speed signal of the traction device; and
 selectively reduce the rotational speed of one of the traction devices if the sensed rotational speed signal for the traction device is greater than the ideal target speed signal for the traction device by actuating a corresponding one of the front clutch, the rear clutch and the center clutch to engage a corresponding one of the first differential gear set, the second differential gear set and the third differential gear set.

16. The articulated truck of claim 15, wherein the first differential gear set includes a first ring gear that is fixed to a first differential gear housing and operatively connected to the transmission output shaft.

17. The articulated truck of claim 15, further including a fourth differential gear set coupled to the transmission output shaft.

18. The articulated truck of claim 15, wherein each traction device attached to each axle shaft of the front, center, and rear axles is a wheel.

19. A method of operating a machine having a cab and a rear body connected by an articulating joint for relative movement about a vertical axis, wherein the cab has a front axle set having a first front axle with a first front traction device and a second front axle with a second front traction device coupled by a front differential and the rear body has a rear axle set having a first rear axle with a first rear traction device and a second rear axle with a second rear traction device coupled by a rear differential, wherein the machine is steered by changing an angle between the cab and the rear body about the vertical axis in response to an input at a steering device, and wherein a main power source of the machine is operatively coupled to the front differential and the front differential is operatively coupled to the rear differential such that the front axle set and the rear axle set both receive torque output by the main power source, comprising:
 sensing a rotational speed of each of the traction devices to determine a sensed rotational speed for each of the traction devices;
 sensing a first rate of change of an orientation of the cab relative to an operating surface to determine a sensed rate of change or orientation of the cab;
 determining a second rate of change of an orientation of the rear body relative to the operating surface as a function of the sensed first rate of change of the orientation of the cab and the sensed rotational speeds of the traction devices;
 determining a speed of the machine relative to the operating surface as a function of the sensed rotational speed signals for the traction devices;
 determining a corner speed signal associated with each of the front traction devices as a function of the speed of the machine and the sensed rate of change of orientation of the cab, and determining a corner speed signal associated with each of the rear traction devices as a function of the speed of the machine and the second rate of change of the orientation of the rear body, the corner speed signal for each of the traction devices being indicative of the speed of the corresponding traction device relative to the operating surface; and
 selectively reducing the rotational speed of one of the traction devices by closing a differential gear set of the corresponding differential if the sensed rotational speed is greater than a target speed value for the traction device.

20. The method of claim 19, wherein the differential gear set interconnects the first axle of the corresponding differential associated with the one of the traction devices with the second axle of the corresponding differential associated with the other of the traction devices.

21. The method of claim 20, further including selectively engaging a clutch operatively associated with the differential gear set to equalize rotational speeds of the corresponding traction devices.

22. The method of claim 20, wherein:
the differential gear set includes a ring gear fixed to a differential gear housing and operatively connected to an output shaft of a transmission; and
a clutch is interconnected between the ring gear and one of the first or second axles.

23. The method of claim 19, further including:
wherein sensing the rotational speeds of each traction device is done with speed sensors; and
wherein sensing the rate of change of an orientation of the cab relative to the operating surface is done with an inertial yaw rate sensor.

24. The method of claim 19, further including:
sensing a center axle acceleration of the machine to determine a sensed acceleration of the machine;
determining a speed of the machine relative to the operating surface as a function of the sensed rotational speeds of the traction devices and the sensed acceleration of the machine; and
determining a corner speed signal associated with the first traction device as a function of the speed of the machine and the sensed rate of change or orientation of the machine, the corner speed signal indicative of the speed of the first traction device relative to the operating surface.

25. The method of claim 19 wherein the differential gear set is a first differential gear set that interconnects the first front axle with the second front axle associated with the second traction device, the method further including:
selectively engaging a second differential gear set interconnecting a first drive shaft and a second drive shaft coupled to a transmission output shaft when the machine operates on an incline grade.

26. The method of claim 25, further including engaging the second differential gear set when the machine operates on an incline grade that is steeper than a predetermined threshold grade.

* * * * *